Patented Apr. 30, 1935

1,999,186

UNITED STATES PATENT OFFICE 1,999,186

CHEMICAL COMPOUNDS AND PROCESS OF MAKING SAME

Robert Barnett Flint, Wilmington, Del., assignor to E. I. du Pont de Nemours & Company, Wilmington, Del., a corporation of Delaware No Drawing. Application August 15, 1933, Serial No. 685,247

8 Claims. (Cl. 134—17)

This invention relates to new compositions of matter useful as coating and plastic compositions, and more particularly to such compositions comprising peracylated rubber together with another material useful in plastic and coating compositions, such as a cellulose derivative or a resin. Peracylated rubber has been prepared by treatment of rubber in chloroform solution with hydrogen peroxide in the presence of various organic acids such as acetic acid.

This invention has as an object, the preparation of new coating compositions utilizing peracylated rubber in combination with cellulose derivatives or resins. A further object is the preparation of molding plastics from similar compositions. A still further object is the preparation of adhesive compositions of a similar nature. A still further object is the preparation of similar impregnated compositions. Other objects will appear hereinafter.

These objects are accomplished by the following invention wherein there are prepared compositions comprising peracylated rubber with a cellulose derivative or a resin.

Peracetylated rubber, prepared by treating rubber in chloroform solution with hydrogen peroxide in the presence of glacial acetic acid, is a resinous, brittle solid soluble in ketones, esters, alcohols, aromatic hydrocarbons, and halogenated hydrocarbons. It is unsaturated, and films flowed from solution dry by oxidation, the drying process being accelerated by the addition of the usual metallic driers such as cobalt, manganese, or lead, compounds.

Peracetylated rubber is very compatible with cellulose derivatives such as cellulose nitrate, ethyl cellulose, and other cellulose ethers, natural resins such as damar and rosin, and rubber. It is compatible in limited proportions with cellulose acetate, phenol-formaldehyde resins, urea-formaldehyde resins, glyceryl phthalate resins, vinyl type resins, etc. The compatibility with drying oils is, curious to say for a material itself drying by oxidation, rather low.

The following examples of the invention are included merely for purposes of illustration. Typical coating compositions containing peracetylated rubber, are as follows. The materials are blended by means of mutual solvents.

Example 1

| | Parts |
|---|---|
| Cellulose nitrate | 12 |
| Peracetylated rubber | 6 |
| Solvent | 180 |

Example 2

| | Parts |
|---|---|
| Cellulose nitrate (low viscosity) | 12 |
| Peracetylated rubber | 4 |
| Damar | 3 |
| Castor oil | 2.6 |
| Solvent | 160 |

Example 3

| | Parts |
|---|---|
| Ethyl cellulose | 8.5 |
| Peracetylated rubber | 1.5 |
| Solvent | 100.0 |

Example 4

| | Parts |
|---|---|
| Damar | 4 |
| Peracetylated rubber | 1 |
| Solvent (toluene) | 10 |

Example 5

| | Parts |
|---|---|
| Rosin | 4 |
| Peracetylated rubber | 1 |
| Solvent (benzene) | 10 |

Example 6

| | Parts |
|---|---|
| Metastyrene | 4 |
| Peracetylated rubber | 1 |
| Solvent (xylene) | 10 |

Example 7

| | Parts |
|---|---|
| Triglyceryl phthalate resin | 5 |
| Peracetylated rubber | 1 |
| Solvent (50:50 acetone-toluene) | 10 |

Example 8

| | Parts |
|---|---|
| Peracetylated rubber | 2 |
| Tertiary amyl phenol-formaldehyde resin | 2 |
| Toluene | 10 |

Example 9

| | Parts |
|---|---|
| Peracetylated rubber | 2 |
| Rosin modified phenol-formaldehyde resin | 2 |
| Toluene | 10 |

Typical plastic combinations which may be prepared by blending with or without solvents in a Werner-Pfleiderer type mixer are given in the following examples. If solvents are used, a steam heated mixer is preferable.

Example 10

| | Parts |
|---|---|
| Cellulose nitrate (high viscosity) | 100 |
| Peracetylated rubber | 35 |

Example 11

| | Parts |
|---|---|
| Ethyl cellulose | 85 |
| Peracetylated rubber | 15 |

Example 12

| | Parts |
|---|---|
| Ethyl cellulose | 100 |
| Peracetylated rubber | 20 |
| Filler (including color) | 200 |

Example 13

| | Parts |
|---|---|
| Metastyrene | 80 |
| Peracetylated rubber | 20 |

Example 14

| | Parts |
|---|---|
| Triglyceryl phthalate | 80 |
| Peracetylated rubber | 20 |

The above compositions may be prepared with or without the usual volatile solvents or diluents, that is, ethyl alcohol for cellulose nitrate compositions, toluol-alcohol mixtures for cellulose ether compositions, etc. Plasticizers such as tricresyl phosphate, castor oil, dibutyl phthalate, etc., may also be employed.

The peracetylated rubber of the above examples was prepared by refluxing at 65° C. 100 grams of milled pale crepe rubber, 700 cc. of chloroform, 500 cc. of glacial acetic acid and 110 grams of 30% hydrogen peroxide for 16 to 18 hours in a vessel equipped with a mechanical stirrer. The solution thus obtained was washed three times with water and the last traces of acetic acid neutralized with dilute sodium carbonate solution. The chloroform solution was then dried with anhydrous sodium sulphate and vacuum distilled. The peracetylated rubber was obtained as a yellow transparent resinous solid.

Peracetylated rubber prepared at 45° C. or lower, other conditions being the same, is softer and upon evaporation of the solvent leaves a tacky and, in cellulose derivative or resin compositions, a somewhat softer film than that obtained by the use of the acetylated rubber prepared at higher temperatures. For this reason the rubber "peracetylated" above 50° C. is preferred. The peracetylation reaction goes to the desired stage more quickly at the higher temperatures.

While the process has been described in terms of peracetylated rubber, the homologs and analogs thereof, such as performylated, perpropionylated, perbutyrylated, perisobutyrylated, perbenzoylated and pertoluylated, etc., rubber may likewise be used. Similar perderivatives of rubber prepared by replacing the acetic acid of the above process by chloracetic, chloropropionic, chlorobutyric, chloroisobutyric, etc., may also be employed.

Plastic and coating compositions may be made, according to the methods of the above description, from peracylated, and preferably peracetylated, rubber with one or more of the following; a cellulose derivative such as: cellulose nitrate, cellulose acetate, cellulose nitro-acetate, cellulose propionate, cellulose butyrate, ethyl cellulose, propyl cellulose; a natural resin or gum or an ester thereof, for example congo, damar, Kauri, rosin, Zanzibar, manila, pontianac, and ester gum; a synthetic resin such as phenol-formaldehyde, polyhydric alcohol-polybasic acid, urea-formaldehyde, and vinyl. Softeners and plasticizers, for example, camphor, aryl phosphates such as tricresyl phosphate, alkyl sulfonamides such as ethyl sulfonamide, alkyl phthalates such as dibutyl phthalate, aryl phthalates such as diphenyl phthalate, glycerol, castor oil, diethylene glycol, vaseline, may be used with the compositions comprising the peracylated, and preferably peracetylated, rubber. Pigments such as lithopone, graphite, lampblack, iron oxide, zinc oxide, white lead, titanium oxide, Prussian blue, and fillers such as wood flour, ground cork, mica, whiting, aluminum powder, diatomaceous earth, may be employed according to the methods known in such compositions. Raw, blown, or hydrogenated drying oils, semidrying oils, and nondrying oils and mineral oils may be used if desired. The compatibility with drying oils is, however, low. Proteins such as casein, glue and gelatin may be used, particularly in the molding compositions.

Compositions comprising peracylated, and preferably peracetylated rubber, with a cellulose derivative or a resin may be used in clear or pigmented compositions as protective coatings for rigid or nonrigid surfaces, for example as coatings for metal or wood, dopes for coating fabrics, paper, etc. Peracylated, and preferably peracetylated, rubber in combination with a cellulose derivative or a resin may be used with or without fillers or pigments in the manufacture of molded articles. These compositions may be used in the production of laminated products in which the peracylated rubber compositions serve as the binding interlayer for sheets of cellulose acetate, cellulose nitrate, mica, glass, etc. Compositions of the present invention may be used as adhesives in the preparation of laminated paper and laminated wood products. These compositions may be employed on any type of material, for example metal, wood, stone, rubber, synthetic rubber, fabrics, regenerated cellulose, plastic compositions, felt, cork, etc. They may also be employed as adhesives for causing wood, paper, cardboard, asbestos board, felt, cork, etc., to adhere to glass, rubber, metal, wood, regenerated cellulose and the like.

The peracylated rubbers, and particularly peracetylated rubber, are soluble in many organic solvents and are therefore quite readily incorporated with other resins and with fillers. Peracetylated rubber forms solutions of lower viscosity than rubber. Its solubility in alcohol and acetone permits the use of cheap solvents. The marked solubility of peracetylated rubber is particularly useful in manufacturing plastic compositions comprising other resins or cellulose derivatives. Peracetylated rubber gives films of good water resistance and good lustre, and is quite noninflammable, burning with difficulty.

Compositions comprising peracylated, and preferably peracetylated, rubber combine a plasticizing action due to the peracylated and particularly the peracetylated rubber, with oxidative drying. In this connection, the relatively low compatibility with drying oils, which likewise oxidatively dry, is remarkable.

Peracetylated rubber does not have an excessive plasticizing action on nitrocellulose, hence these two components can be satisfactorily employed in proportion substantially different from those which would be expected by one familiar with the coating and plastic arts.

The term "resin" as used in the claims includes natural and synthetic resins and modified natural resins, that is, such derivatives as resin esters which are themselves resinous.

It is to be noted that the components used with peracylated, and preferably, peracetylated rubber, are film forming materials which form films essentially by evaporation of solvent rather than by oxidative drying, as is the case with drying oils.

As many apparently widely different embodiments of this invention may be made without departing from the spirit thereof, it is to be understood that I do not limit myself to the specific embodiments thereof except as defined in the appended claims.

I claim:

1. Composition of matter comprising peracylated rubber and a film forming material of the class consisting of cellulose derivatives and resins, the peracyl group of said peracylated rubber being derived from a monobasic acid.

2. Composition of matter comprising peracetylated rubber and a film forming material of the class consisting of cellulose derivatives and resins.

3. Composition of matter comprising rubber peracetylated above 50° C. and a film forming material of the class consisting of cellulose derivatives and resins.

4. Composition of matter comprising peracetylated rubber and a cellulose derivative.

5. Composition of matter comprising peracetylated rubber and cellulose nitrate.

6. Composition of matter comprising peracetylated rubber and ethyl cellulose.

7. Composition of matter comprising peracetylated rubber and a phenol-formaldehyde resin.

8. Composition of matter comprising peracylated rubber and a cellulose derivative, the peracyl group of said peracylated rubber being derived from a monobasic acid.

ROBERT BARNETT FLINT.